US007583836B2

(12) United States Patent
Hund

(10) Patent No.: US 7,583,836 B2
(45) Date of Patent: Sep. 1, 2009

(54) METHOD AND DEVICE FOR PROCESSING COLOR INFORMATION OF A PATTERN HAVING CLUTTERED AND USEFUL INFORMATION CHARACTERS

(75) Inventor: Martin Hund, Allensbach (DE)

(73) Assignee: Captaris, Inc., Bellevue, WA (US)

( * ) Notice: Subject to any disclaimer, the term of this patent is extended or adjusted under 35 U.S.C. 154(b) by 555 days.

(21) Appl. No.: 10/549,063

(22) PCT Filed: Mar. 10, 2004

(86) PCT No.: PCT/EP2004/002465
§ 371 (c)(1),
(2), (4) Date: May 11, 2006

(87) PCT Pub. No.: WO2004/084122
PCT Pub. Date: Sep. 30, 2004

(65) Prior Publication Data
US 2006/0210149 A1 Sep. 21, 2006

(30) Foreign Application Priority Data
Mar. 17, 2003 (DE) ................. 103 11 700

(51) Int. Cl.
*G06K 9/00* (2006.01)
(52) U.S. Cl. ..................................... 382/162
(58) Field of Classification Search ......... 382/162–167, 382/173, 176, 181; 358/3.21, 515–520, 462–464
See application file for complete search history.

(56) References Cited

U.S. PATENT DOCUMENTS
5,014,328 A  5/1991  Rudak
(Continued)

FOREIGN PATENT DOCUMENTS
DE  42 05 579  8/1992
(Continued)

OTHER PUBLICATIONS

Signal Processing VI: Theories and Applications J. Vandewalle, R. Boite, M. Moonen A. Oosterinck (eds.) 1992 Elsevier Science Publishers B.V. p. 535-538 Low-Level Segmentation of Complex Color Images.

Oce Document Technologies—RecoStar Professional[Plus]bringt Farbe ins Spiel, 1992.

*Primary Examiner*—Jose L Couso
(74) *Attorney, Agent, or Firm*—Perkins Coie

(57) ABSTRACT

In a method for processing of color information of a document provided with noise characters and usable characters, a digital image of the document is generated comprised of image points. At least one image region of a first type is selected corresponding to a region of the document that contains noise characters but no usable characters. A brightness value range based on brightness value ranges of image points of the first type is established. For saturation values of image points of the first type whose brightness values lie in the established brightness value range, a frequency with which these saturation values occur in the image region of the first type is determined. Based on these saturation values whose determined frequency exceeds a predetermined value, a saturation value range containing these saturation values is established. For color tone values of image points of the first type whose brightness values lie in the established brightness value range, a frequency with which these color tone values occur in the image region of the first type is determined. Based on color tone values whose determined frequency exceeds a predetermined value, a color tone value range containing these color tone values is established. Colors of those image points whose brightness values lie in the established brightness value range, whose saturation values lie in the established saturation value range, and whose color tone values lie in the established color tone value range are associated with a first color class of colors corresponding to the noise characters. Colors of image points of the first type that are not associated with the first color class are associated with a second color class of colors corresponding to a character-less document. At least one image region of a second type is selected known to correspond to a region that contains neither noise nor usable characters. Colors of image points of the second type whose brightness values lie in the established brightness value range, whose saturation values lie in the established saturation value range, and whose color tone values lie in the established color tone value range are excluded from the first color class and are associated with the second color class.

21 Claims, 3 Drawing Sheets

U.S. PATENT DOCUMENTS

| | | |
|---|---|---|
| 5,014,329 A | 5/1991 | Rudak |
| 5,335,292 A | 8/1994 | Lovelady et al. |
| 5,751,854 A * | 5/1998 | Saitoh et al. ............... 382/218 |
| 6,064,762 A | 5/2000 | Haenel |
| 6,272,248 B1 * | 8/2001 | Saitoh et al. ............... 382/218 |
| 6,473,522 B1 | 10/2002 | Lienhart et al. |
| 6,628,833 B1 * | 9/2003 | Horie ........................ 382/173 |
| 6,868,178 B1 | 3/2005 | Frei et al. |
| 7,003,174 B2 * | 2/2006 | Kryukov et al. ............ 382/266 |
| 7,027,660 B2 * | 4/2006 | Hersch et al. .............. 382/257 |
| 7,050,651 B2 * | 5/2006 | Zaklika et al. .............. 382/275 |
| 2002/0118883 A1 | 8/2002 | Bhatt |

FOREIGN PATENT DOCUMENTS

| | | |
|---|---|---|
| DE | 44 45 386 | 5/1996 |
| DE | 198 28 396 | 1/2000 |
| DE | 198 45 996 | 4/2000 |
| EP | 0 576 704 | 1/1994 |
| WO | WO 01/11547 | 2/2001 |
| WO | WO 01/77998 | 10/2001 |

* cited by examiner

METHOD AND DEVICE FOR PROCESSING COLOR INFORMATION OF A PATTERN HAVING CLUTTERED AND USEFUL INFORMATION CHARACTERS

CROSS-REFERENCE TO RELATED APPLICATION(S)

This application is a U.S. National Phase of International Application No. PCT/EP2004/002465 filed on Mar. 10, 2004, entitled METHOD AND DEVICE FOR PROCESSING OF THE COLOR INFORMATION OF A DOCUMENT PROVIDED WITH NOISE CHARACTERS AND USEABLE CHARACTERS, which application is hereby incorporated by reference in its entirety.

BACKGROUND

Methods for automatic character detection are known from the prior art, with which methods the usable information (for example in the form of usable characters) contained in a document, for example a form, is acquired. Such methods are, for example, known under the designation ICR and OCR. ICR here stands for "intelligent character recognition" and OCR for "optical character recognition".

As a rule a separation between usable information and noise information must be effected before the actual character recognition can be implemented. This separation is necessary for suppression of interfering image points that would otherwise cause too many errors in the character recognition. Any information on the document that is not to be associated with the usable information is thereby considered as noise information. Thus, for example, forms are typically provided with form fields that contain completion instructions such as name, address etc. The form fields (that are frequently marked by a colored frame) and the completion instructions in this case form noise characters that contain noise information to be separated from the usable information.

As a rule, the form fields and the completion instructions are printed in a color noticeable to the user, for example green. In order to acquire the usable information from such a form (which usable information is in this case given by the characters entered by the user with a pen or a typewriter), the noise information must first be suppressed in order to be able to subsequently recognize the usable information.

In particularly simple supported cases in which, for example, dark writing is to be separated from a light background, the noise information can be suppressed via a binary value formation. A first binary value is associated with those image points of the digital image of the document that are associated with the light background and a second binary value is associated with those image points that are associated with the dark writing.

However, such a method does not work reliably when the background is printed in color, as this is the case in the forms (described above) provided with color form fields and color completion instructions. It is additionally aggravating that, as a rule, the color that is used for completion of the forms is not known.

Various methods are known from the prior art with which known background colors (meaning, in the forms described above, the colors of the form fields, the colors of the completion instructions as well as the colors of the paper used for the forms) can be suppressed in a pre-processing step before the binary value formation and the subsequent character recognition. These methods (also designated as color filtering methods) are based on a color filter calculated ahead of time. However, such a color filter must be "trained" or "taught" via a suitable method. This means that, before the actual color filtering, the filter properties must be established based on a representative selection of forms so that the subsequent color filtering also works reliably when the forms to be processed exhibit differences with regard to color tone, brightness and saturation.

However, the methods described in the preceding break down when a color filtering should, for example, be effected on a stack of forms of which one comprises blue completion instructions and red usable characters while in another exactly the reverse color relationships exist (meaning that red completion constructions and blue usable characters are provided). These methods are accordingly not suitable for applications in which the colors of the usable characters and of the noise characters are not already essentially known and in which no known contrast ratio of usable characters to noise characters can be assumed. It is thus not possible to effect a separation of usable information and noise information with this method given an unknown color composition of the form to be processed.

For prior art, reference is made to the printed document DE 42 02 579. There a color filtering method is described in which a transformation of the color space RGB into the color space HSI is effected for a digital image comprised of image points. A detector compares the saturation values of the image points with a threshold. The detector forms a running length detector that detects a continuous bit series whose saturation values lie above the threshold. As soon as N pixels in succession exhibit a saturation lying above the threshold, meaning that a continuous line segment exists with a minimum saturation, it is assumed that these N pixels represent a form color. This is evidently based on the realization that such continuous line segments only occur in document regions in which no written characters are present (rather, they occur in the form background). A buffer receives the HSI signal such that, in addition to the saturation values of the aforementioned line segment, the color tone values and the brightness values of this segment are now also provided for further processing. A histogram calculation (not explained in detail) is then effected in a circuit. Finally, in an order to complete the class of the form colors, in a generator further colors are added (using variance considerations) to those colors that are determined by the detector, the buffer and the circuit cited in the preceding.

For prior art, reference is also made to the printed documents WO 01/11547 A, U.S. Pat. Nos. 5,014,328 A, 6,473, 522 B1, 5,014,329 A, Schettini R ED—Vandewalle J et al.: "LOW-LEVEL SEGMENTATION OF COMPLEX COLOR IMAGES", Signal Processing Theories and Applications, Brussels, Aug. 24-27, 1997, Proceedings of the European signal processing conference (EUSIPCO), Amsterdam, Elsevier, NL, Bd. Vol. 1 Conf. 6, 24th Aug. 1992, pages 535-538, XP000348717 (ISBN: 0-444-89587-6), DE 198 28 396 A1, DE 198 45 996 A1, DE 44 45 386 C1, EP 0 576 704 A1, US 2002/0118883 A1, "RecoStar Color Professional Plus bringt Farbe ins Spiel", Océ Document Technologies 3/01-500-B.

SUMMARY OF THE INVENTION

It is an object to specify a method and a device for processing of the color information of a document provided with noise characters and usable characters that enable the noise information presented by the noise characters to be effectively suppressed.

In a method for processing of color information of a document provided with noise characters and usable characters, a digital image of the document is generated comprised of image points whose color is respectively established by a brightness value, a saturation value, and a color tone value. At least one image region of a first type is selected which is known to correspond to a region of the document that contains noise characters but no usable characters. A brightness value range based on brightness value ranges of image points of the image region of the first type is established, said brightness value range being assumed to contain brightness values of the image points corresponding to the noise characters. For saturation values of those image points of the image region of the first type whose brightness values lie in the established brightness value range, a frequency with which these saturation values occur in the image region of the first type is respectively determined. Based on these saturation values whose determined frequency exceeds a predetermined value, a saturation value range containing these saturation values is established. For color tone values of those image points of the image region of the first type whose brightness values lie in the established brightness value range, a frequency with which these color tone values occur in the image region of the first type is respectfully determined. Based on those color tone values whose determined frequency exceeds a predetermined value, a color tone value range containing these color tone values is established. The colors of those image points of the image region of the first type whose brightness values lie in the established brightness value range, whose saturation values lie in the established saturation value range, and whose color tone values lie in the established color tone value range are associated with a first color class of colors corresponding to the noise characters. The colors of those image points of the image region of the first type that are not associated with the first color class are associated with a second color class of colors corresponding to a character-less document. At least one image region of a second type is selected which is known to correspond to a region of the document that contains neither noise characters nor usable characters. The colors of those image points of the image region of the second type whose brightness values lie in the established brightness value range, whose saturation values lie in the established saturation value range, and whose color tone values lie in the established color tone value range are excluded from the first color class and are associated with the second color class.

Figure 1:
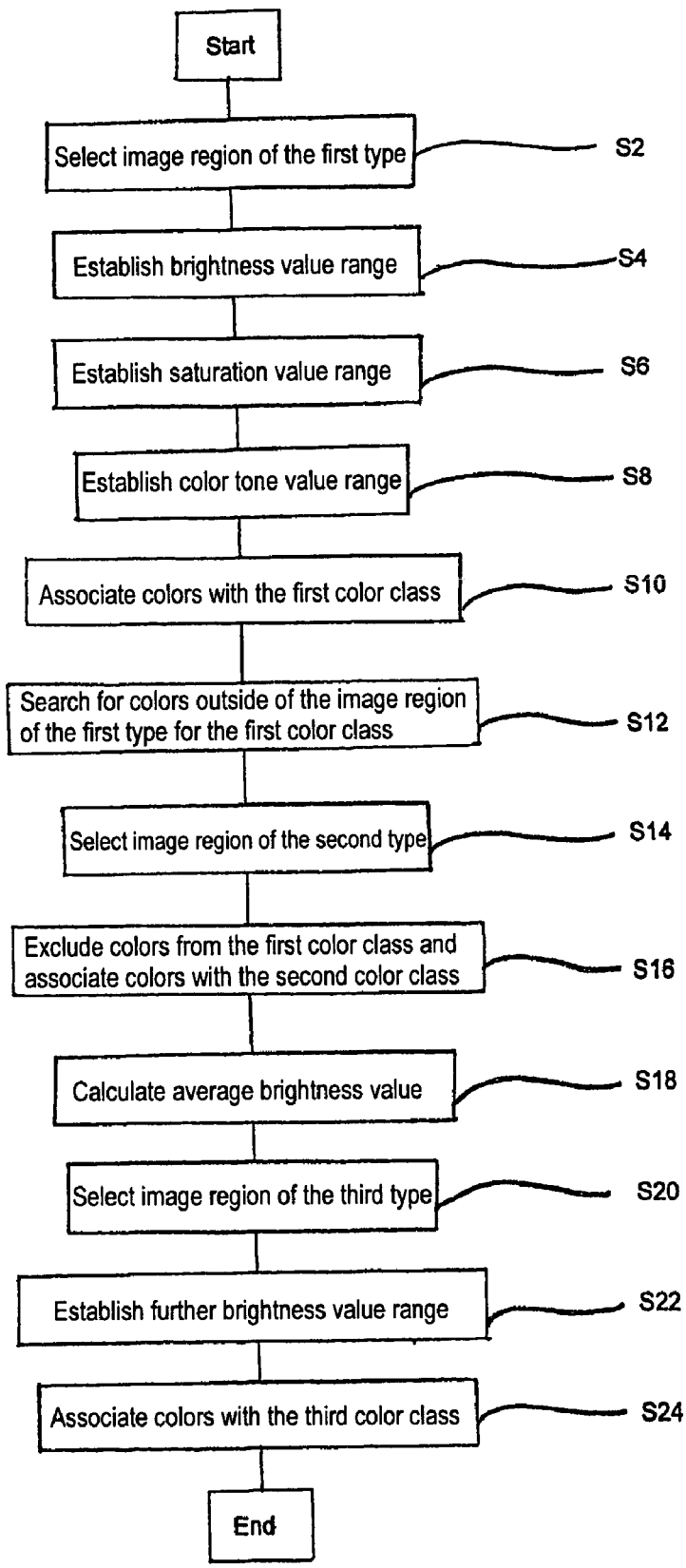
FIG. 1 is a flow diagram of a method for processing of the color information of a document.

DESCRIPTION OF THE PREFERRED
EMBODIMENT

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

The method processes the color information based on the brightness, the saturation and the color tone. The processing is not limited to a specific color space. Color spaces suitable for the method are, for example, the known spaces LAB, HSI and RGB. Color-determining characteristics that correspond to the brightness, the saturation and the color tone can be specified in all of these color spaces.

The method according to the preferred embodiment permits automatic processing even of such documents in which neither the colors of the noise characters and of the usable characters nor their color contrast ratio are known. For the successful implementation of the method, it is sufficient that the usable characters and the noise characters exhibit a difference with regard to the color determining characteristic of brightness. If this is given, the method can be applied to each individual document to be processed in order to determine, specifically for this document, which colors are to be suppressed as noise information.

The method does not require a foreknowledge about which colors are representative for a document type. Compared with the known color filtering methods described above, in which all previously-known differences of the documents to be processed with regard to color tone, brightness and saturation must be incorporated into the determination of the filter properties, the inventive method provides much more precise color information about the document that can be used for suppression of the colors corresponding to the noise characters. The invention in particular provides a particularly efficient processing of the color information.

The proposed method is advantageously applicable in automatic character recognition, for example an ICR or OCR method. In this application, the method is implemented before the actual character recognition in order to suppress the noise information contained in the document. The preferred embodiment is in particular applicable to the method described in WO 01/77998 A1, which traces back to the inventor of the of the present application.

However, the method of the preferred embodiment is not limited to the application specific in the preceding. It is suitable for all applications in which the color information processed by the method can be used. For example, the method can be used in order to establish the filter properties of a filter used in a known color filtering method.

In the exemplary embodiment shown in FIG. 1, the color information of a document is processed, and the noise characters and usable characters are obtained.

The document is, for example, a typical form made of paper in which completion instructions containing form fields are provided. The user of the form enters characters (that, for example, specify his name, his address or the like) into these form fields, for example with a pen or a typewriter. The form fields and the completion instructions respectively have an arbitrary color so that the user is observant of the form fields and the completion instructions contained in them. For example, the form fields are present in a light green and the completion instructions in a dark green. The color of the characters to be entered into the form fields by the user is also arbitrary, for example red or blue.

So that the form can be processed in a method for automatic character recognition, for example an ICR method or an OCR method, in a pre-processing step the usable information present in the form must initially be separated from the noise information present in the form. In the present exemplary embodiment, the form fields and the completion instructions contained in them are interpreted as noise characters containing noise information and the characters entered in the form by the user are interpreted as usable characters containing usable information.

Up to three color classes are generated as a result in the method shown in FIG. 1. Those colors that occur in the noise characters are associated with a first color class. Those colors that occur in the characterless form (i.e. the colors of the form paper itself without noise characters and usable characters) are associated with a second color class. Finally, those colors that occur in the usable characters are associated with a third color class.

A digital image that is generated in a known manner via analog-digital conversion is processed in the method shown in FIG. 1. This digital image is comprised of image points with which a brightness value, a saturation value and a color tone value are respectively associated. A color space within which any arbitrary color can be represented is established by the three color-determining characteristics of brightness, saturation and color tone. However, it is to be noted that the method is applicable to any color spaces, for example to the LAB color space, the HSI color space, the RGB color space etc.

After the start of the method, in step S2 a region of the digital image is selected that corresponds to a region of the form that contains noise characters but no usable characters. This method step is based on the realization that, in every form, there are typically regions in which no usable characters occur but noise characters and unprinted paper do occur. For example, such a region is given by a form field largely completely printed with completion instructions, in which form field the user with high probability enters no usable characters. The region of the digital image selected in step S2 is designated in the following as an image region of the first type.

In step S4, a brightness value range is established based on the brightness values of the image points of the selected image region of the first type. The establishment of the brightness value range thereby occurs so that the latter contains the brightness values of the image points of the image region of the first with regard to the noise characters. For this purpose, the largest brightness value Hmax and the smallest brightness value Hmin of the image points contained in the image region of the first type are initially determined. It thereby depends only on the values themselves but not on the locations of the image points in which these values occur. Under consideration of the maximal brightness value Hmax and of the minimal brightness value Hmin, the brightness value range cited in the preceding is now established, and in fact according to the following condition (1):

$$0 < H < H\max - \frac{H\max - H\min}{k}, \quad (1)$$

wherein H designates the brightness values and k designates a whole number not equal to zero. A suitable value of k is, for example, 4.

Via the suitable selection of the brightness value range according to condition (1), of those image points of the image region of the first type whose brightness values fulfill the condition (1) it can be assumed with high probability that they correspond to the noise characters, meaning in this exemplary embodiment to the form fields and the completion instructions contained therein. A first indication for the possible colors that exhibit the noise characters present in the form is accordingly given by the condition (1).

Due to the establishment of the brightness value range according to condition (1), a brightness value range that is directly complementary to this is directly established that is given by the following condition ($\overline{1}$):

$$H > H\max - \frac{H\max - H\min}{k} \quad (\overline{1})$$

It can be assumed of those image points whose brightness values lie in the brightness value range established by the condition ($\overline{1}$) that they exhibit colors that are associated with the character-less form, i.e. the unprinted form paper.

In step S6, a frequency distribution is determined for the saturation values of those image points of the image region of the first type whose brightness value lies in the brightness value range established by the condition (1), and which frequency distribution specifies with which frequency these saturation values occur in the image region of the first type. The value range of this frequency distribution is preferably quantized in a predetermined number of m stages. For example, if the possible saturation values lie in a range from 0 to 255, m=10 specifies a suitable number of quantization stages. In order to suppress the possibly tampering influence of only seldom-occurring saturation values, the determined frequency distribution is divided by a suitable normalization constant (for example the value 100).

Figure 2:
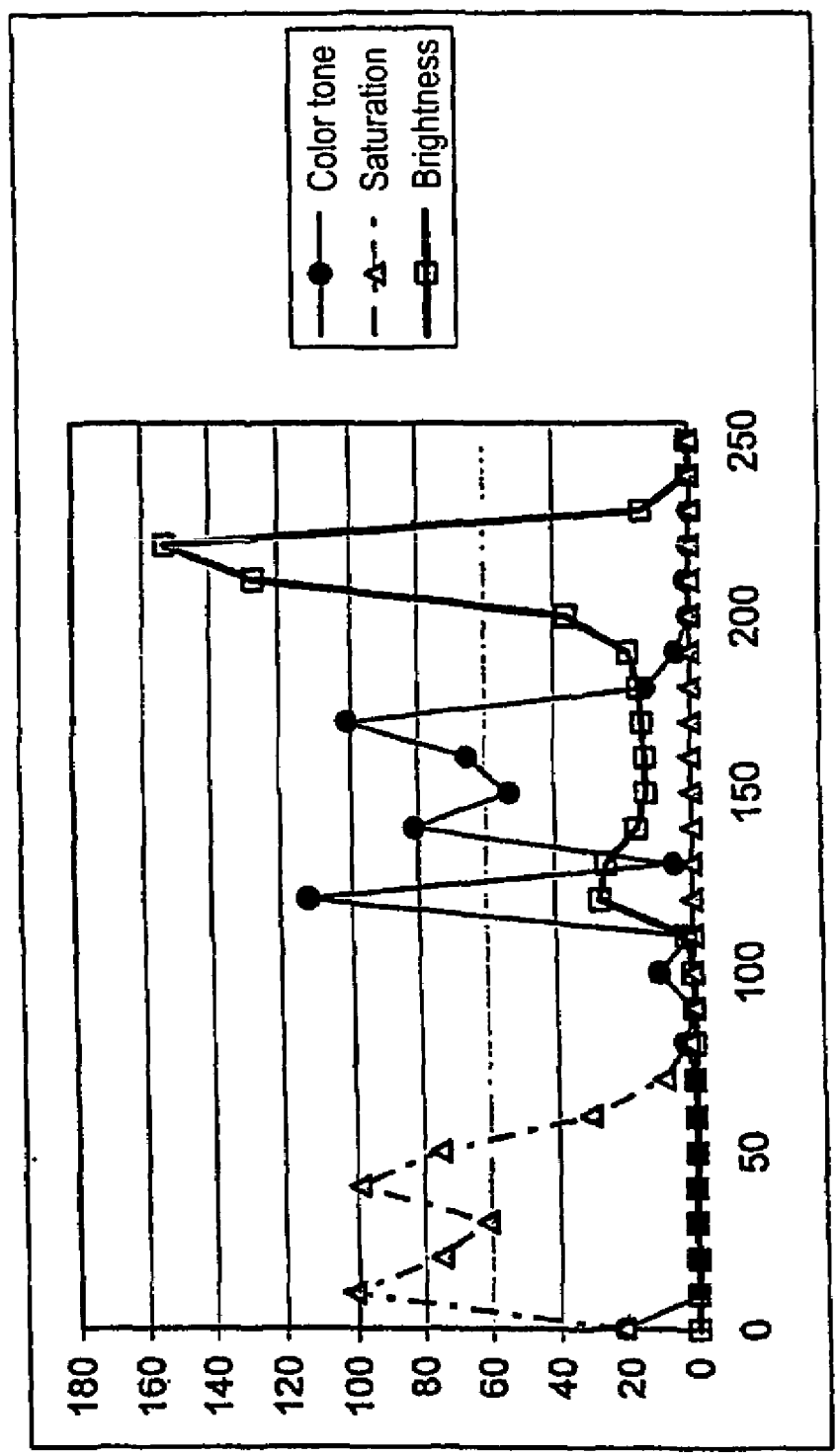
FIG. 2 is a diagram with frequency distributions of brightness values, saturation values and color tone values.

The frequency distribution thus determined for the saturation values is shown in FIG. 2. In the diagram according to FIG. 2, the possible saturation values 0 through 255 are plotted on the abscissa and the frequency values belonging to the respective saturation values are plotted on the ordinate. The shown frequency values are thereby already divided by the normalization constant of 100 (cited above).

A saturation value range is now established from the frequency distribution of the saturation values shown in FIG. 2. In this exemplary embodiment, the saturation value range is established such that it contains only saturation values whose determined frequency exceeds the value 0. As is to be learned from FIG. 2, this is the range that extends from the saturation value 0 to approximately the saturation value 70.

In step S8, a frequency distribution is determined for the color tone values of those image points of the image region of the first type whose brightness values lie in the brightness value range established by the condition (1), which frequency distribution specifies with which frequency these color tone values occur in the image region of the first type.

For this, reference is again made to FIG. 2, in which the frequency distribution of the color tone values and a frequency distribution of the brightness values are also shown in addition to the frequency distribution of the saturation values. The two last-cited frequency distributions can already be determined simultaneously with the determination of the frequency distribution of the saturation values in step S6, and in fact under the numerical specifications described there (i.e. with m=10, a respectively-available value range from 0 to 255 and a division by the normalization constant 100). The determined frequency distributions according to FIG. 2 thus given complete information about how frequently the respective brightness values, saturation values and color tone values occur in the image region of the first type.

A color tone value range is now established based on the frequency distribution of the color tone values shown in FIG. 2. In this exemplary embodiment, the color tone value range is established so that it contains only those color tone values whose determined frequency exceeds the value 0. As is to be learned from FIG. 2, this is the range that extends approximately from the color tone value 90 to approximately the color tone value 190.

Three value ranges for the color-determining characteristics of brightness, saturation and color tone that correspond to the noise characters of the form are accordingly established in the steps S4 through S8. Based on these three value ranges, the colors occurring in the image region of the first type and related to the noise characters are associated with the first color class cited above. This occurs in the step S10. The colors of those image points of the image region of the first type whose brightness values lie in the brightness value range established according to condition (1) in step S4, whose saturation values lie in the saturation value range established in step S6 and whose color tone values lie in the color tone value range established in step S8 are thus associated with the first color class there.

After step S10 has been implemented, all colors which exhibit the noise characters in the image region of the first type are known and associated with the first color class. In order to determine further colors of noise characters occurring in the form and to associate these with the first color class, further image regions of the first type can be selected and the steps S4 through S10 are respectively applied to these regions. The first color class is thereby more reliably established than with only a single image region of the first type. However, given color forms of simple design, the consideration of only a single image region of the first type can certainly be sufficient in order to reliably establish the first color class. In particular it is to be noted that only the steps S2 through S10 respectively executed once are necessary for the method in its simplest realization. However, little by little further color information is acquired by the further steps described in the following, which color information can, for example, be profitably used in a method for automatic character recognition.

In step S12, image points are determined outside of the image region of the first type whose brightness values lie in the brightness value range established in step S4, whose saturation values lie in the saturation value range established in step S6 and whose color tone values lie in the color tone value range established in the step S8. The colors of the image points determined in this manner are then associated with the first color class. In step S12, colors that correspond to the noise characters can thus be sought in the entire form. The first color class is thereby further completed.

In step S14, a region of the digital image is selected that corresponds to a region of the form that contains neither noise characters nor usable characters. These techniques are based on the realization that in nearly every form regions are present that are completely unprinted. These are normally strip-shaped regions that extend along the entire border or also only along one of the two lateral borders. The region of the digital image selected in step S14 that corresponds to such a region of the form is designated in the following as an image region of the second type.

In step S16, the colors of those image points of the image region of the second type whose brightness values lie in the brightness value range established in step S4, whose saturation values lie in the saturation value range established in step S6 and whose color tone values lie in the color tone value range established in the step S8 are excluded from the first color class and associated with the second color class. Thus in step S16 the first color class is limited in that, for example, colors are excluded from this color class that have been previously been mistakenly associated, and at the same time the second color class is established.

According to step S16, the color information acquired from the form is associated with two color classes, of which the first contains the colors related to the noise characters and the second contains the colors related to the character-less form, i.e. the form paper itself. Both color classes can form the basis of a color filtering via which the noise information embodied by the noise characters is suppressed in order to arrive at the useable information embodied by the usable characters.

A plurality of image regions of the second type can also be selected and the steps S14 and S16 can be respectively applied to these regions, corresponding to the procedure described above with regard to the image regions of the first type. An even more reliable establishment of the first color class and of the second color class is thereby achieved.

The steps described in the following serve for the generation of the third color class which contains the colors related to the usable characters. As explained above, it is already possible with the first color class alone (but in particular additionally with the second color class) to effectively suppress the noise information in order to arrive at the usable information. However, it frequently occurs that, in addition to the noise and usable characters described above (meaning, for example, the form fields the completion information contained in these and the entries made by the user), a form contains further color information that represents no usable information.

Forms thus frequently comprise fouled, stamped or smeared regions. Such regions are in particular created given the use of color carbon copies or given stacking of the forms with other papers whose colors are running. Moreover, the forms are frequently not filled out cleanly and are marked across the form fields provided for marking. In order to prevent that the circumstances described in the preceding hinder the processing of the color information, the steps S18 through S24 are provided in this exemplary embodiment. With these steps the third color class is generated which contains the colors corresponding to the usable characters. Via the knowledge of these colors, reliable differentiation can still be made between usable and noise information in borderline cases, for example given the occurrence of mixed colors.

An average brightness value of those image points that are contained in the image region of the second type selected in step S14 is determined in step S18. This average brightness value is used in the step S22 (described later).

A region of the digital image that corresponds to a region of the form in which usable characters but no noise characters are present is selected in step S20. In a form there are typically always regions in which usable characters but no noise characters (i.e. form fields and completion instructions) are to be found. These usable characters are thus located in an otherwise character-less form region. The region of the digital image selected in step S20 corresponds to such a form region and is designated in the following as an image region of the third type.

Based on the average brightness value determined in step S18, in step S22 a brightness value range is established according to the following condition (2):

$$H < H_{AVERAGE} - q \qquad (2)$$

wherein H designates the brightness values, $H_{AVERAGE}$ designates the average brightness value and q designates a quantity dependent on the average brightness value.

The quantity q preferably fulfills the following dependency (3)

$$q = 0.1 \cdot H_{AVERAGE} \qquad (3)$$

In step S24, the colors of those image points of the image region of the third type that are not associated with the first color class and that lie in the brightness value range specified by the dependency (3) are associated with the third color class, which contains the colors corresponding to the usable characters. The method shown in the flow diagram according to FIG. 1 ends after step S24.

As already described for the image regions of the first and second type, a plurality of regions can also be selected for the image region of the third type, and this region can be successively processed according to the steps S20 through S24. The third color class can thereby be generated even more reliably.

In the exemplary embodiment of the method described with reference to FIGS. 1 and 2, the first, the second and the third color class (and therewith more and more color information) are successively acquired (i.e. quasi-learned) starting from a color document that is arbitrary with regard to paper color, color of the noise characters and color of the usable characters. For the document, a color classification into the cited three color classes can be effected accordingly based on an arbitrary color space.

This classification can form the basis for an arbitrary color filtering method. The method is thereby restarted for each document. The method then generates the three color classes for each document, and in fact without blurrings that occur in the method known from the prior art, in that a series of different color variances must be accounted for in the filter calculation. Given a processing of a stack comprised of a plurality of documents, it is also not necessary to sort the documents into a predetermined sequence so that cases that are contrary to one another with respect to the colors of usable characters and noise characters can also be automatically handled in the method of the preferred embodiment. Such a case is, for example, provided when the usable characters are red and the noise characters are blue in one document and the usable characters are blue and the noise characters are red in another document.

The method of the preferred embodiment for processing of the color information can also be used in order to determine, in an automatic process based on a reference stack comprised of a plurality of documents, the filter properties of a filter that can be used in a typical color filtering process. This circumstance is described in the following with reference to FIG. 3.

Figure 3:
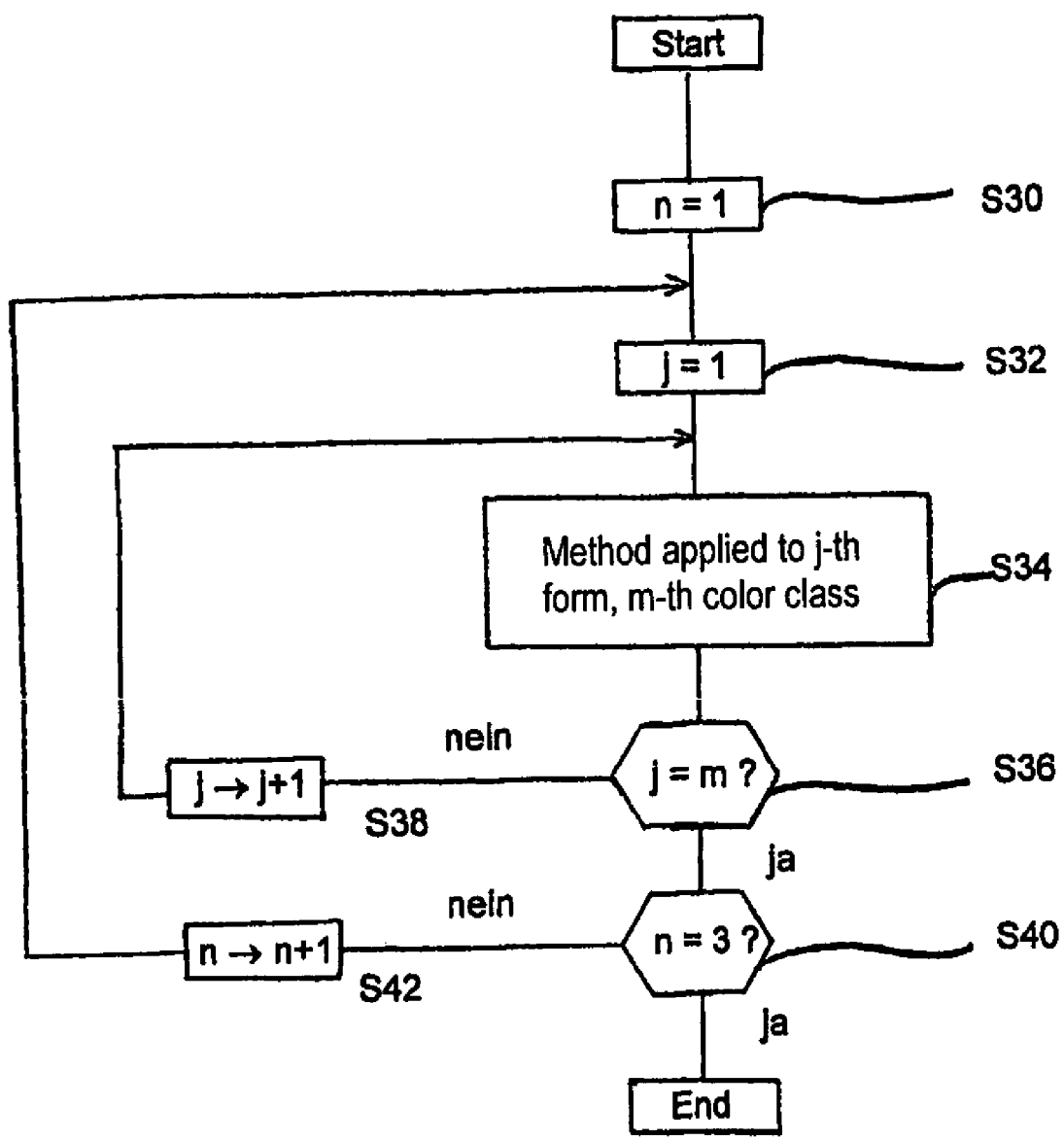
FIG. 3 is a flow diagram that shows how the filter properties of a color filter are established with the method of the preferred embodiment.

In the following, it is assumed that the method shown in the flow diagram according to FIG. 1 is applied to a plurality of forms that are respectively provided with noise characters and usable characters. The colors of the noise characters and of the usable characters as well as of the paper of which the forms are comprised can thereby be arbitrarily different. The number of the forms present in the stack should amount to m. In FIG. 3 the three color classes are numbered with a counter variable n and the forms are numbered with a counter variable j.

After the start of the process shown in FIG. 3, the counter variable n is set to 1 in step S30. The counter variable j is subsequently set to 1 in step S32. In step S34, the method according to FIG. 1 is applied to the first form (j=1). The colors thereby determined are associated with the first color class (n=1). In step S36, it is checked whether the counter variable j is equal to the value m, i.e. equal to the number of the forms present in the stack. Since this is not the case with the first form, the process proceeds with step S38, in which the counter variable j is increased by 1 (i.e. set to 2). The process then returns to step S34, in which the method according to FIG. 1 is applied to the second form (j=2) present in the stack, whereby the colors determined on the basis of the second form are added to the first color class (n=1).

The loop containing the steps S34, S36 and S38 is run until the counter variable j is equal to m in step S36, i.e. the method according to FIG. 1 has been applied to all [sic] in the present forms. Via this loop, the first color class is successively expanded by the colors determined from the forms processed in succession, which colors correspond to the noise characters of the respective forms.

If, in step S36, it is established that j is equal to m, in step S40 it is checked whether n is equal to 3. Since n is equal to 1 in the present case, the counter variable n is increased by 1 to 2 in step S42, whereupon the process returns to step S32. The counter variable j is reset to 1 again in step S32. Via the loop formed by the steps S34, S36 and S38, the method according to FIG. 1 is now applied again in succession to all forms in order to generate the second color class or to successively expand this by the colors corresponding to the character-less forms (i.e. the form papers themselves without usable and noise characters).

If, in step S36 it is established that the counter variable is equal to m, the second color class is completed. The process then proceeds with step S40, in which it is checked whether the counter variable n is equal to 3. Since, in this case, the counter variable n is not equal to 3 but rather is equal to 2, the process proceeds with step S42, in which the counter variable n is increased by 1 (i.e. set to 3). The process subsequently jumps back to step S32, in which the counter variable j is set to 1. The process then runs repeats for the last time the loop formed by the repeated processing of this loop. Via the repeated execution of this loop, the method according to FIG. 1 is successively applied to the forms present in the stack in order to generate the third color class or to successively expand this by the colors that correspond to the usable characters. If the method in step S34 has been applied to the m-th form, in step S36 it is established that the counter variable j is equal to m. In step S40 it is subsequently established that the counter variable n is equal to 3. The process thus ends.

Via the process shown in FIG. 3, the first color class, the second color class and the third color class are thus constructed from the color information of the forms present in the stack. The filter characteristics that in turn determine the filter properties can be established with these color classes. The filter characteristics can then be provided with tolerances in a typical manner.

The process shown in FIG. 3 thus enables it to automatically determine the filter characteristics of the filter. It is thereby not necessary to manually select image points and image regions (as in conventional methods) that should be associated with the usable characters or the noise characters.

The process shown in FIG. 3 thus allows a largely automatic calculation of an optimal filter so that no new filter calculation is necessary given the actual color filtering of new documents. Calculation time is thereby saved.

All three color classes are established (n=1, 2, 3) in the process shown in FIG. 3. However, it is likewise possible to implement this process only for the first color class (n=1) or, however, to implement this process for the first color class and the second color class (n=1, 2) when the color information therewith provided is sufficient for the establishment of an efficiently-operating filter. The number of the filter classes to be established by the process can be selected dependent on the document type to be processed.

Although a preferred exemplary embodiment is shown and described in detail in the drawings and in the preceding specification, it should be viewed as purely exemplary and not as limiting the invention, it is thereupon noted that only a preferred exemplary embodiment is shown and described, and all variations and modifications that presently and in the future lie within the protective scope of the invention should be protected.

I claim as my invention:

1. A method for processing of color information of a document provided with noise characters and usable characters, the method performed by a computer system with a processor and memory, the method comprising the steps of:
   generating a digital image of the document comprised of image points whose color is respectively established by a brightness value, a saturation value, and a color tone value;
   selecting at least one image region of a first type which is known to correspond to a region of the document that contains noise characters but no usable characters;
   establishing a brightness value range based on brightness value ranges of image points of the image region of the first type, said brightness value range being assumed to contain brightness values of the image points corresponding to the noise characters, wherein establishing the brightness value range is performed by the processor executing instructions stored in the memory;
   for saturation values of those image points of the image region of the first type whose brightness values lie in the established brightness value range, respectively determining a frequency with which these saturation values occur in the image region of the first type, wherein determining the frequency with which these saturation values occur is performed by the processor executing instructions stored in the memory;
   based on those saturation values whose determined frequency exceeds a predetermined value, establishing a saturation value range containing these saturation values, wherein establishing the saturation value range is performed by the processor executing instructions stored in the memory;
   for color tone values of those image points of the image region of the first type whose brightness values lie in the established brightness value range, respectively determining a frequency with which these color tone values occur in the image region of the first type, wherein determining the frequency of color tone values is performed by the processor executing instructions stored in the memory;
   based on those color tone values whose determined frequency exceeds a predetermined value, establishing a color tone value range containing these color tone values, wherein establishing the color tone value range is performed by the processor executing instructions stored in the memory;
   associating the colors of those image points of the image region of the first type whose brightness values lie in the established brightness value range, whose saturation values lie in the established saturation value range, and whose color tone values lie in the established color tone value range with a first color class of colors corresponding to the noise characters, wherein associating the colors with the first color class is performed by the processor executing instructions stored in the memory;
   associating the colors of those image points of the image region of the first type that are not associated with the first color class with a second color class of colors corresponding to a character-less document, wherein associating the colors with the second color class is performed by the processor executing instructions stored in the memory;
   selecting at least one image region of a second type which is known to correspond to a region of the document that contains neither noise characters nor usable characters; and
   excluding the colors of those image points of the image region of the second type whose brightness values lie in the established brightness value range, whose saturation values lie in the established saturation value range, and whose color tone values lie in the established color tone value range from the first color class and associating said colors with the second color class, wherein excluding the colors from the first color class and associating said colors with the second color class is performed by the processor executing instructions stored in the memory.

2. A method according to claim 1 wherein a largest brightness value and a smallest brightness value of the image points of the image region of the first type are determined and the brightness value range is established such that its brightness values H fulfill the following conditions:

$$0 < H < H\max - \frac{H\max - H\min}{k}$$

wherein Hmax designates a largest brightness value, Hmin designates a smallest brightness value and k designates a whole number not equal to zero.

3. A method according to claim 1 wherein a frequency distribution of the brightness values, the saturation values and color tone values are respectively determined for the image points of the image region of the first type whose brightness value ranges lie in the established brightness value range, which frequency distribution specifies the frequency of the respective values in the image region of the first type, and the frequency distributions are respectively quantized in a predetermined number of stages and are subsequently divided by a predetermined normalization constant.

4. A method according to claim 1 wherein image points whose brightness values lie in the established brightness value range, whose saturation values lie in the established saturation value range, and whose color tone values lie in the established color tone value range are determined outside of the image region of the first type, and the colors of these determined image points are associated with the first color class.

5. A method according to claim 1 wherein at least one image region of a third type is selected which is known to correspond to a region of the document that contains usable characters but no noise characters, and the colors of those image points of the image region of the third type that are not associated with the first color class are associated with a third color class of colors corresponding to the usable characters.

6. A method according to claim 5 wherein an average brightness value of the image points of the image region of the second type is determined, a further brightness value is established on the basis of an average brightness value of the image points of the image region of the second type, and the colors of those image points of the image region of the third type that are not associated with the first color class are only associated with the third color class when the brightness values of these image points lie in the further brightness value range.

7. A method according to claim 6 wherein the further brightness value range is established such that its brightness values H fulfill the following condition:

$$H < H_{AVERAGE} - q$$

Wherein $H_{AVERAGE}$ designates the average brightness value and q designates a quantity dependent on the average brightness value.

8. A method according to claim 7 wherein the quantity q that is dependent on the average brightness value fulfills the following condition:

$$q = 0.1 \times H_{AVERAGE}$$

9. A method according to claim 1 wherein in a first step the method is initially applied to a first document provided with noise characters and usable characters in order to associate the colors corresponding to the noise characters of the first document with the first color class, and in a second step the method is subsequently applied to at least one further, second document in order to add to the first color class the colors corresponding to the noise characters of the second color class.

10. A method according to claim 9 wherein in a third step the method is applied again to the first document in order to associate the colors corresponding to the character-less first document with the second color class, and in a fourth step the method is subsequently applied again to the second document in order to add to the second color class the colors corresponding to the character-less second document.

11. A method according to claim 10 wherein in a fifth step the method is applied again to the usable characters of the first document with a third color class, and in a sixth step the method is subsequently applied to the second document in order to add to the third color class the colors corresponding to the usable characters of the second document.

12. A method according to claim 5 wherein the filter properties of a color filter are established based on at least the first or the third color class, which color filter can be used in an automatic character recognition in order to separate the information corresponding to the noise characters from the information corresponding to the usable characters.

13. A method according to claim 12 wherein the filter properties of the color filter are also established on the basis of the second color class.

14. A computer system for processing color information of a document having noise characters and usable characters, the computer system comprising:
- a processor; and a memory; wherein the processor executes instructions stored in the memory to perform steps comprising:
- generating a digital image of the document comprised of image points whose color is respectively established by a brightness value, a saturation value, and a color tone value;
- selecting at least one image region of a first type which is known to correspond to a region of the document that contains noise characters but no usable characters;
- establishing a brightness value range based on image points of the image region of the first type;
- for saturation values of those image points of the image region of the first type lying in the established brightness value range, respectively determining a frequency with which these saturation values occur in the image region of the first type;
- based on those saturation values whose determined frequency exceeds a predetermined value, establishing a saturation value range containing these saturation values;
- for color tone values of those image points of the image region of the first type whose brightness values lie in the established brightness value range, respectively determining a frequency with which those color tone values occur in the image region of the first type;
- based on those color tone values whose determined frequency exceeds a predetermined value, establishing a color tone value range containing these color tone values;
- associating the colors of those image points of the image region of the first type whose brightness values lie in the established brightness value range, whose saturation values lie in the established saturation value range, and whose color tone values lie in the established color tone value range with a first color class of colors corresponding to the noise characters;
- associating the colors of those image points of the image region of the first type that are not associated with the first color class with a second color class of colors corresponding to a character-less document;
- selecting at least one image region of a second type which is known to correspond to a region of the document that contains neither noise characters nor usable characters; and
- excluding the colors of those image points of the image region of the second type whose brightness values lie in the established brightness value range, whose saturation values lie in the established saturation value range, and whose color tone values lie in the established color tone value range from the first color class and associating said colors with the second color class.

15. A method of transforming a document into a format suitable for automatic character recognition, the method performed by a computer system with a processor and a memory, the method comprising:
- generating a digital image of the document, the digital image comprised of image points, wherein each image point is associated with a color established by a brightness value, a saturation value, and a color tone value;
- selecting at least one region of the digital image, wherein the at least one region is of a first type, wherein the first type has at least one noise character and no usable characters;
- establishing a brightness value range for the at least one region of the first type, said brightness value range based on brightness values of at least two image points located in the at least one region of the first type wherein establishing the brightness value range is performed by the processor executing instructions stored in the memory;
- determining a saturation value for at least one image point in the at least one region of the first type having a brightness value within the established brightness value range;
- calculating a saturation value frequency that said saturation value occurs in the at least one image region of the first type wherein calculating the saturation value frequency is performed by the processor executing instructions stored in the memory;
- establishing a saturation value range, wherein the saturation value range includes said saturation value if the calculated saturation value frequency of said saturation value exceeds a predetermined saturation threshold value;
- determining a color tone value for at least one image point in the at least one region of the first type wherein establishing the saturation range is performed by the processor executing instructions stored in the memory;
- having a brightness value within the established brightness value range;
- calculating a color tone value frequency that said color tone value occurs in the at least one image region of the first type wherein calculating a color tone value frequency is performed by the processor executing instructions stored in the memory;

establishing a color tone value range, wherein the color tone value range includes said color tone value if the calculated color tone value frequency of said color tone value exceeds a predetermined color tone threshold value;

associating a color of an image point of the at least one image region of the first type wherein establishing the color value range is performed by the processor executing instructions stored in the memory;

with a first color class if the image point has a brightness value that lies in the established brightness value range, if the image point has a saturation value that lies in the established saturation value range, and if the image point has a color tone value that lies in the established color tone value range, wherein the first color class corresponds to noise characters;

associating a color of an image point of the at least one image region of the first type wherein associating the colors with the first color class is performed by the processor executing instructions stored in the memory;

with a second color class if the color of the image point is not associated with the first color class;

selecting at least one second region of the digital image, wherein the at least one second region of the digital image is of a second type wherein associating the colors with the second color class is performed by the processor executing instructions stored in the memory;

wherein the second type contains neither noise characters nor usable characters;

excluding a color of an image point of the at least one image region of the second type wherein excluding the colors from the first color class is performed by the processor executing instructions stored in the memory;

from the first color class if the image point has a brightness value that lies in the established brightness value range, if the image point has a saturation value lies in the established saturation value range, and if the image point has a color tone value that lies in the established color tone value range; and associating a color of an image point of the at least one image region of the second type wherein associating said colors with the second color class is performed by the processor executing instructions stored in the memory;

with the second color class if the image point has a brightness value that lies in the established brightness value range, if the image point has a saturation value lies in the established saturation value range, and if the image point has a color tone value that lies in the established color tone value range.

16. A method according to claim 15 wherein a largest brightness value and a smallest brightness value of the image points of the image region of the first type are determined and the brightness value range is established such that its brightness values H fulfill the following conditions:

$$0 < H < H\max - \frac{H\max - H\max}{k}$$

wherein Hmax designates the largest brightness value, Hmin designates the smallest brightness value and k designates a whole number not equal to zero.

17. A method according to claim 15 wherein a frequency distribution of the brightness values, the saturation values and color tone values are respectively determined for the image points of the image region of the first type whose brightness value ranges lie in the established brightness value range, which frequency distribution specifies the frequency of the respective values in the image region of the first type, and the frequency distributions are respectively quantized in a predetermined number of stages and are subsequently divided by a predetermined normalization constant.

18. A method according to claim 15 wherein image points whose brightness values lie in the established brightness value range, whose saturation values lie in the established saturation value range, and whose color tone values lie in the established color tone value range are determined outside of the image region of the first type, and the colors of these determined image points are associated with the first color class.

19. A method according to claim 15 wherein at least one image region of a third type is selected which is known to correspond to a region of the document that contains usable characters but no noise characters, and the colors of those image points of the image region of the third type that are not associated with the first color class are associated with a third color class of colors corresponding to the usable characters.

20. A method according to claim 15 wherein an average brightness value of the image points of the image region of the second type is determined, a further brightness value is established on the basis of an average brightness value of the image points of the image region of the second type, and the colors of those image points of the image region of the third type that are not associated with the first color class are only associated with the third color class when the brightness values of these image points lie in the further brightness value range.

21. A method according to claim 20 wherein the further brightness value range is established such that its brightness values H fulfill the following condition:

$$H < H_{AVERAGE} - q$$

Wherein $H_{AVERAGE}$ designates the average brightness value and q designates a quantity dependent on the average brightness value.

* * * * *